(12) United States Patent
Elder et al.

(10) Patent No.: US 6,592,842 B2
(45) Date of Patent: Jul. 15, 2003

(54) NANOCRYSTALLINE HETEROJUNCTION MATERIALS

(75) Inventors: Scott H. Elder, Portland, OR (US); Yali Su, Richland, WA (US); Yufei Gao, Blue Bell, PA (US); Steve M. Heald, Downers Grove, IL (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/859,799

(22) Filed: May 16, 2001

(65) Prior Publication Data

US 2002/0071970 A1 Jun. 13, 2002

Related U.S. Application Data

(63) Continuation-in-part of application No. 09/411,360, filed on Oct. 1, 1999, now abandoned.

(51) Int. Cl.⁷ .................... C01G 23/047; C01G 23/00; B01J 23/00
(52) U.S. Cl. .................... 423/610; 423/598; 502/309; 502/351
(58) Field of Search ................ 423/598, 610; 502/309, 350, 351

(56) References Cited

U.S. PATENT DOCUMENTS

| | | | |
|---|---|---|---|
| 5,149,519 A | 9/1992 | Chopin et al. | |
| 5,162,283 A | 11/1992 | Moini | |
| 5,177,045 A | 1/1993 | Anthony et al. | |
| 5,215,943 A | 6/1993 | Anderson et al. | |
| 5,304,363 A | 4/1994 | Beck et al. | |
| 5,354,548 A | 10/1994 | Araya et al. | |
| 5,718,878 A | 2/1998 | Zhang | |
| 5,720,805 A | 2/1998 | Wellinghoff et al. | |
| 5,919,430 A | 7/1999 | Hasenzahl et al. | |
| 5,935,895 A | 8/1999 | Baiker et al. | |
| 5,958,367 A | 9/1999 | Ying et al. | |
| 6,037,289 A | 3/2000 | Chopin et al. | |
| 6,048,910 A | 4/2000 | Furuya et al. | |
| 6,075,203 A * | 6/2000 | Wang et al. | 136/256 |
| 6,093,236 A * | 7/2000 | Klabunde et al. | 95/128 |
| 6,121,191 A * | 9/2000 | Komatsu et al. | 502/330 |
| 6,205,015 B1 * | 3/2001 | Wada et al. | 361/321.4 |
| 6,264,912 B1 * | 7/2001 | Hu | 423/598 |
| 6,265,341 B1 * | 7/2001 | Komatsu et al. | 502/326 |
| 6,444,189 B1 * | 9/2002 | Wang et al. | 423/610 |

FOREIGN PATENT DOCUMENTS

WO    WO 99/43616    9/1999

OTHER PUBLICATIONS

U.S. patent application Ser. No. 09/411,360, Oct. 1, 1999, Elder et al.

Yang, P. et al., Generalized syntheses of large–pore mesoporous metal oxides with semicrystalline frameworks *Nature*, 396: 152–155 (1998).

Elder, S. et al., Zirconia–Stabilized 25–Å $TiO_2$ Anatase Crystallites in a Mesoporous Structure, *Chem. Mater.*, 10: 3140–3145 (1998).

Tian, Z. et al., Manganese Oxide Mesoporous Structures: Mixed–Valent Semiconducting Catalysts, *Science*, 276: 926–930 (1997).

(List continued on next page.)

*Primary Examiner*—Stanley S. Silverman
*Assistant Examiner*—Cam N. Nguyen
(74) *Attorney, Agent, or Firm*—Klarquist Sparkman, LLP (57) ABSTRACT

Mesoporous nanocrystalline titanium dioxide heterojunction materials are disclosed. In one disclosed embodiment, materials comprising a core of titanium dioxide and a shell of a molybdenum oxide exhibit a decrease in their photoadsorption energy as the size of the titanium dioxide core decreases.

11 Claims, 7 Drawing Sheets

OTHER PUBLICATIONS

Bagshaw, S. et al., Mesoporous Alumina Molecular Sieves, *Angew. Chem Int.*, 35: 1102–1105 (1996).

Ciesla, U. et al., Formation of a Porous Zirconium Oxo Phosphate with a High Surface Area by a Surfactant–Assisted Synthesis, *Angew. Chem. Int.*, 35: 541–543 (1996).

Antonelli, D. et al., Synthesis of Hexagonally Packed Mesoporous $Tio_2$ by a Modified Sol–Gel Method, *Angew. Chem. Int.*, 34: 2014–2017 (1995).

Huo, Q. et al., Generalized synthesis of periodic surfactant/inorganic composite materials, *Nature*, 368: 317–321 (1994).

Kortan, A. et al., Nucleation and Growth of CdSe on ZnS Quantum Crystallite Seeds, and Vice Versa, in Inverse Micelle Media, *J. Am. Chem. Soc.* 112: 1327–1332 (1990).

* cited by examiner

NANOCRYSTALLINE HETEROJUNCTION MATERIALS

CROSS-REFERENCE TO RELATED APPLICATION

This is a continuation-in-part of U.S. patent application Ser. No. 09/411,360, filed Oct. 1, 1999, now abadoned, which is incorporated herein by reference.

ACKNOWLEDGEMENT OF GOVERNMENT SUPPORT

This invention was made with Government support under Contract DE-AC0676RL01830 awarded by the U.S. Department of Energy. The Government has certain rights in this invention.

FIELD

The present invention relates to nanocrystalline materials. More specifically, mesoporous nanocrystalline titanium dioxide materials comprising titanium dioxide and a second metal oxide are disclosed.

BACKGROUND

Since the discovery that titanium dioxide can act as a photocatalyst for the splitting of water, the substance has attracted the attention of scientists. The substance, however, exhibits two principal physical limitations. First, titanium dioxide absorbs light at energies greater than 3.2 eV; well outside the most intense region of the ambient solar spectrum (centered at ~2.6 eV). Second, since titanium dioxide functions as a heterogeneous catalyst, catalytic activity is limited by surface area.

Titanium dioxide exists in at least three crystalline forms: anatase, rutile, and brookite. Anatase is the form that exhibits the highest catalytic activity and much effort has been directed toward providing anatase powders with increased stability and high surface areas.

Anatase nanocrystallites (i.e crystals with a diameter in the range of 20 Å to 100 Å) are of interest because their photophysical and catalytic properties differ from the bulk material (See for example, Brus, *J. Phys. Chem.*, 90: 2555–2560, 1986). Nanocrystallite properties are a direct result of the particle size and dimensionality, making adjustment of crystallite size and architecture an avenue to materials with novel photophysical and catalytic properties. Unfortunately, such small particles are difficult to handle, exhibit poor thermal stability, and exhibit a blue shift (i.e., further away from the ambient solar maximum) in their absorption relative to the bulk material.

Mesoporous materials offer an attractive alternative for increasing the surface area of a substance without making it difficult to handle. Mesopores (i.e. pores from about 20 Å to about 140 Å in diameter) provide a high surface area per unit mass through an increase in internal surface area and make it unnecessary to reduce the overall size of the particles to increase surface area. In contrast to microporous materials (i.e. materials having pore sizes of less than about 15 Å), mesoporous materials show much higher rates of diffusion into and out of the pores, an attractive feature for a catalyst.

A general approach to the production of mesoporous materials by templating the formation of an inorganic oxide framework around surfactant micelles is disclosed in Huo et al., *Nature*, 368:317–321, 1994. Micelle size (a function of surfactant size) determines mesopore size in the as-synthesized materials. The surfactant micelles are removed from the resulting material by solvent extraction or thermal oxidation (calcination). The result is a mesoporous material having inorganic oxide walls between the pores.

Mesoporous silica and aluminosilicate materials with surface areas above 1000 $m^2\ g^{-1}$ have been synthesized by surfactant templating (see for example, Kresge et al., *Nature*, 359: 710–712 and Beck et al. *J. Am. Chem. Soc.*, 114: 10834–10843). Mesoporous titanium doped metal silicates formed in a similar manner are disclosed in Hasenzahl, et al., U.S. Pat. No. 5,919,430. Thermally stable mesoporous materials with metal oxides as the principal wall component have been more elusive.

Mesoporous titanium dioxide materials are disclosed by Zhang in U.S. Pat. No. 5,718,878 (Zhang). These materials are formed using alkylamine micelles as the structure-directing agent. Zhang also discloses a method of treating the materials with a second metal compound after mesopore formation and wall crystallization has occurred. Despite this treatment, however, these materials still experience a significant loss of surface area upon calcination.

A mesoporous titanium dioxide material that does not lose pore structure upon calcination is described by Elder et al. (Elder et al., *Chem. Mater.*, 10: 3140–3145, 1998). This material, comprising nanocrystalline anatase particles surrounded by amorphous zirconium oxide is stable and exhibits high surface areas. However, as is typical of nanocrystalline materials in general, the material exhibits a blue shift in photoabsorption energy (PE), exacerbating one of the principal limitations of titanium dioxide materials, insufficient absorption of solar radiation.

SUMMARY

Mesoporous nanocrystalline titanium dioxide heterojunction materials as described herein are a surprising new class of materials that overcome the principal limitation of zirconium oxide stabilized mesoporous nanocrystalline titanium dioxide.

DETAILED DESCRIPTION

New heterojunction materials exhibit red-shifted photoabsorption energies (PE's) that contrast sharply with the blue-shifted PE's typical of zirconium oxide stabilized nanocyrstalline titanium oxide materials and nanocrystalline materials in general. In some embodiments, the new titanium dioxide heterojunction materials show a PE that corresponds closely with the ambient solar maxiumum (~2.6 eV).

Disclosed mesoporous nanocrystalline titanium dioxide heterojunction materials comprise a nanocrystalline titanium dioxide phase chemically bonded to a phase of a second metal oxide through a heterojunction formed at an interface between the phases. As used herein, a heterojunction is a boundary between a nanocrystalline titanium dioxide phase and a second metal oxide phase along which their electronic oribitals overlap. Orbital overlap at the interface between the two oxide phases allows electronic transitions to occur between the valence band (HOMO-highest occupied molecular orbital) of one oxide phase and the conduction band (LUMO-lowest unoccupied molecular orbital) of the second oxide phase. Nanocrystalline heterojunction materials therefore possess unique photophysical properties, not seen for materials where contacting metal oxide phases are not chemically bonded (e.g., in zirconia stabilized mesoporous nanocrystalline titantium dioxide). For example, the disclosed nanocrystalline titanium dioxide heterojunction materials are characterized by a red-shift in PE that correlates with the extent of chemical interaction between the nanocrystalline titanium dioxide phase and the second metal oxide phase at their interface. In some instances the red-shift is sufficient to bring the PE of the material below the PE's of both titanium dioxide and the second metal oxide. Heterojunction materials may exhibit photochromism and fluorescent properties not seen for either metal oxide alone.

In some embodiments, the disclosed nanocrystalline titanium dioxide heterojunction materials comprise a nanocrystalline titantium dioxide core and a shell of a second metal oxide, wherein the two oxide phases are chemically bonded through a heterojunction at the interface between the core and the shell. The shell may vary from less than a complete monolayer of the second metal oxide on the surface of the core to one or more monolayers of the second metal oxide phase that substantially surround the core. In particular embodiments, a molybdenum oxide shell surrounds a nanocrystalline anatase core. In more particular embodiments the molybdenum oxide shell has a structure substantially similar to $\alpha$-$MoO_3$. In these materials, the PE systematically shifts to the red as the molybdenum oxide shell varies in size from less than a monolayer to about two full monolayers.

Mesoporous nanocrystalline titanium dioxide heterojunction materials may be prepared by combining a water-soluble polyoxometallate cluster and a water-soluble titanium chelate in the presence of cationic surfactant micelles. In the disclosed methods, a water-soluble titanium chelate, a cationic surfactant, and a water-soluble polyoxometallate cluster of a second metal, are combined in water to form a solution that contains micelles of the surfactant. A precipitate may form spontaneously from the solutions or after further addition of water. The precipitate is then aged hydrothermally and the micelle template may be removed from the resulting material by solvent extraction or calcination of the precipitate.

The water-soluble titanium chelate may be a chelate of titanium with an alpha-hydroxy acid, such as lactic acid. The cationic surfactant may be a tetraalkylammonium surfactant, such as a tetraalkyl ammonium surfactant with at least one carbon chain of 8 to 24 carbons, for example cetyltrimethylammonium chloride (CTAC).

It is currently believed that polyoxometallate clusters, particularly those structurally characterized by octahedra of metal and oxygen atoms and more particularly those characterized by edge-sharing octahedral structures, are capable of chemically interacting with and forming heterojunctions with nanocrystalline titanium dioxide. In some embodiments, the pH of the polyoxometallate solution is adjusted to stabilize the octahedral arrangement of metal and oxygen atoms in the cluster. In particular embodiments, if the polyoxometallate cluster comprises a metal selected from the group consisting of Al, Mo, W, V and combinations thereof the pH of the solution is from pH 3 to 6. In another particular embodiment, if the polyoxometallate cluster comprises Nb the pH of the solution is from 10 to 13. In some embodiments, the water-soluble polyoxometallate cluster comprises octahedral units of structure $MO_6$ where M is chosen from the group consisting of V, W, Nb, Mo, Al and combinations thereof. In other embodiments, the polyoxometallate clusters are anionic and in more particular embodiments, the polyoxometallate cluster is selected from the group consisting of $Mo_8O_{26}^{4-}$, $V_{10}O_{28}^{6-}$, $Nb_6O_{19}^{8-}$, $W_{12}O_{39}^{6-}$, and mixtures thereof. Additional examples of iso- and hetero-polyoxometallate complexes, including anionic complexes and complexes having octahedral arrangements of metal and oxygen atoms, may be found, for example, in Cotton and Wilkinson, *Advanced Inorganic Chemistry*, 5$^{th}$ ed., John Wiley and Sons, 1988 which is incorporated herein by reference.

Like other surfactant templated mesoporous materials, the size of the mesopores in the disclosed heterojunction materials may be adjusted from 20 Å to 140 Å. The size of the titanium dioxide nanocrystallites in the disclosed heterojunction materials may also be adjusted, for example, from 25 Å to 100 Å. In core-shell heterojunction materials, thickness of the metal oxide shell may influence overall diameter of the core-shell structure and the diameter of the core. In a particular embodiment, the overall diameter of nanocrystalline titanium dioxide core/molybdenum oxide shell structures and the diameter of the titanium dioxide core decrease as the thickness of the molybdenum oxide shell increases. Surprisingly, as the diameter of the nanocrystalline titanium dioxide core becomes smaller the PE is still red-shifted due to heterojunction formation.

Methods for preparing heterojunction materials (e.g., molybdenum oxide/titanium dioxide core-shell materials) may be contrasted with methods for preparing non-heterojunction materials (e.g., zirconia stabilized mesoporous nanocrystalline titanium dioxide materials). Heterojunction materials are synthesized from polyoxometallate complexes whereas non-heterojunction materials are synthesized from metal salts.

Use of polyoxometallate complexes as a reagent leads to surprisingly different structures and properties for the resultant materials. It appears that polyoxometallate complexes react to form distinct metal oxide phases in contact through a heterojunction, with nanocrystalline titanium dioxide phases. Heterojunction formation at the interface between metal oxide phases in these materials is evidenced by their surprising photophysical properties. Unlike typical nanocrystalline titanium dioxide materials, the disclosed heterojunction materials exhibit red-shifted photoabsorption energies, such as a photoabsorption energy lower than 3.2 eV.

EXAMPLE 1

Preparation of TiO2—$(MoO_3)_x$ Core-Shell Materials: a Heterojunction Material

The core-shell materials were synthesized by a co-nucleation of metal oxide clusters at the surface of surfactant micelles. In this instance, the molybdenum oxide was provided as a polyoxometallate complex. The general reaction stoichiometry for the preparation of the $TiO_2$—$(MoO_3)_x$ materials is shown in the equation below:

$$(1-y)(NH_4)_2Ti(OH)_2(C_3H_4O_2)_2(aq)+(y/8)\,Na_4Mo_8O_{26}(aq)+CTAC(aq) \quad (1)$$

$(y \leq 0.57)$

As an example, for the synthesis of $TiO_2$—$(MoO_3)_{0.18}$ 4.8 g (y=0.10) of $(NH_4)_2Ti(OH)_2(C_3H_4O_2)_2$ (Tyzor LA,; Dupont) were combined with 4.9 g of cetyltrimethylammonium chloride surfactant (CTAC, 29 wt % aqueous solution, Lonza). To this solution, 30 ml of a 1.8 mM $Na_4Mo_8O_{26}$ aqueous solution was added with vigorous stirring, which produced a voluminous white precipitate. The $Na_4Mo_8O_{26}$ aqueous solution was made by dissolving $Na_2MoO_4 \cdot 2H_2O$ in $H_2O$, and adjusting the pH to 3.5 with concentrated HCl.

The reaction was stirred at room temperature overnight, at 70° C. for 24 h, and at 100° C. for 48 h in a sealed Teflon reactor (hydrothermal aging step). The precipitate was isolated by washing and centrifuging several times with water, and the CTAC was removed by calcining in air at 450° C. for 2 h. The synthesis of $TiO_2$—$(MoO_3)_{0.54}$ (y=0.25), $TiO_2$—$(MoO_3)_{1.1}$ (y=0.50), and $TiO_2$—$(MoO_3)_{1.8}$ (y=0.57) were accomplished in an analogous manner, and the chemical compositions were determined by elemental analysis. The quantity y (equation 1) can be continuously varied from 0.01 to 0.57, but the four core-shell compositions described above adequately represent the range of structural and electronic properties displayed by the $TiO_2$—$(MoO_3)_x$ compounds. It is important to note that if no CTAC was included, or if the CTAC was substituted with $NH_4Cl$, no precipitation reaction occurred at any point in the reaction steps. Furthermore, if no $Mo_8O_{26}^{4-}$ (aq) was included in the reaction, only a white solid was produced, and the same observation was made if only $Mo_8O_{26}^{4-}$ (aq) was used in reaction 1. Only bulk crystalline $TiO_2$ and $\alpha$-$MoO_3$ can be prepared for y>0.57, which is indicative of macroscopic phase separation.

The variable x in the $TiO_2$—$(MoO_3)_x$ nomenclature was calculated as follows. The $MoO_3$ shell thickness was calculated by considering the elemental analysis data, the surface area of the powders (Table 1 below), and the crystallographic structure of $\alpha$-$MoO_3$. The Mo surface density on the (010) plane of $\alpha$-$MoO_3$ is $6.8 \times 10^{18}$ $m^{-2}$, and this Mo surface density, combined with the measured surface area, was used to define the $MoO_3$ monolayer coverage for the shell. For example, one monolayer is one layer of corner sharing $MoO_6$ octahedra, and two monolayers has the thickness of one of the slabs oriented perpendicular to the b-axis of $\alpha$-$MoO_3$.

TABLE 1

Elemental analysis data (mol % Mo) and surface area for the $TiO_2$-$(MoO_3)_x$ materials that were used to calculate the number of $MoO_3$ monolayers (x) in the shell (y refers to the reaction stoichiometry in equation 1).

| Core-shell Material | Y | Mol % Mo | surface area ($m^2/g$) |
|---|---|---|---|
| $TiO_2$—$(MoO_3)_{0.18}$ | 0.10 | 2 | 125 |
| $TiO_2$—$(MoO_3)_{0.55}$ | 0.25 | 10 | 200 |
| $TiO_2$—$(MoO_3)_{1.1}$ | 0.50 | 25 | 205 |
| $TiO_2$—$(MoO_3)_{1.8}$ | 0.57 | 30 | 150 |

EXAMPLE 2

Characterization of $TiO_2$—$(MoO_3)_x$ Core-Shell Materials

Figure 1:
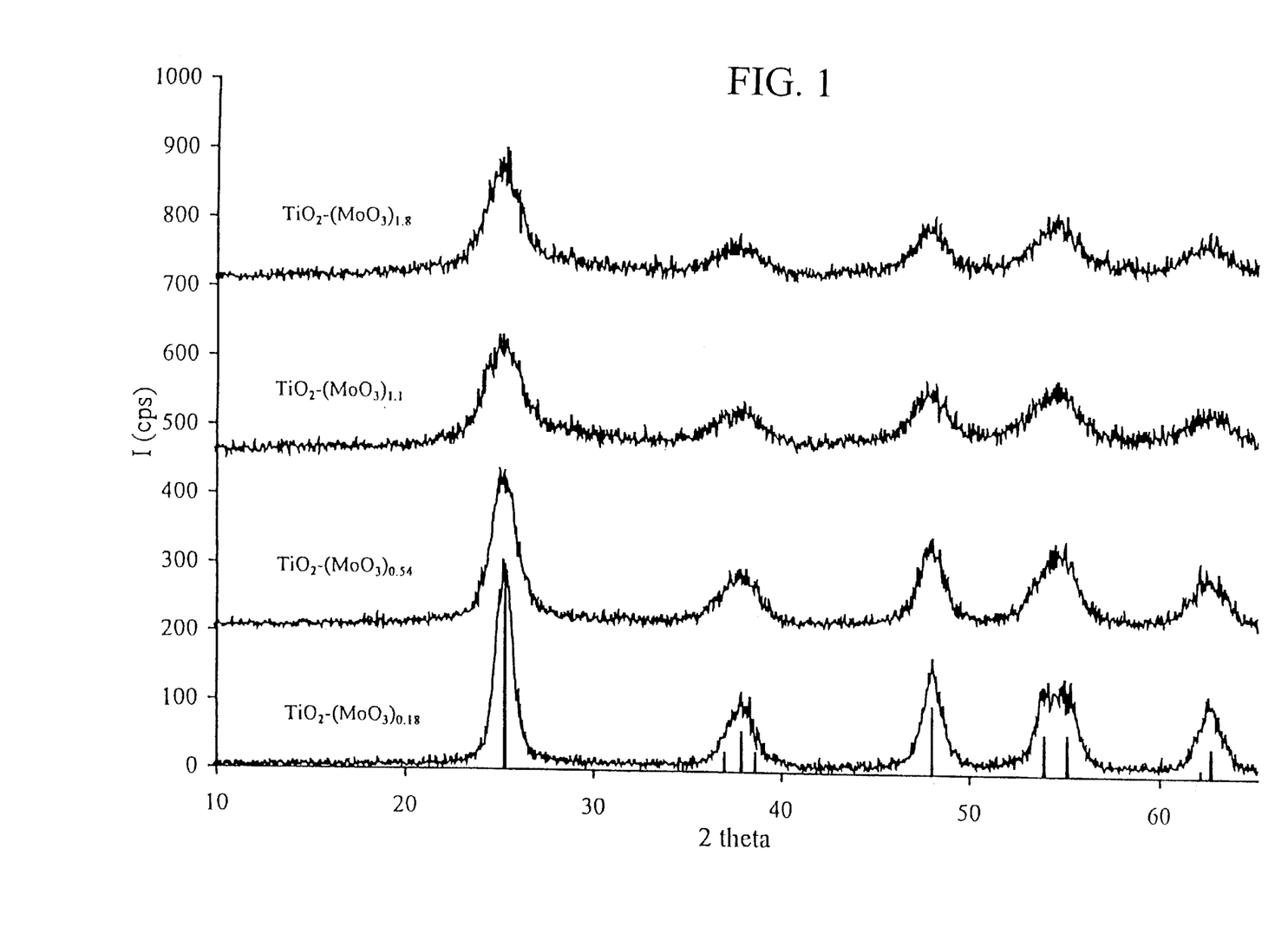
FIG. 1 shows XRPD diffraction data for a series of $TiO_2$—$(MoO_3)_x$ core-shell compounds.

The color of the calcined $TiO_2$—$(MoO_3)_x$ powders was expected to be white, or possibly very light yellow, because the transition metals are in their fully oxidized state (i.e. $d^0$). In contrast, they surprisingly displayed a variety of colors ranging from gray-green to green as a function of $MoO_3$ content. XRPD (X-ray powder diffraction) studies were conducted to ascertain how the crystallographic structures of the $TiO_2$—$(MoO_3)_x$ compounds correlated with these colors. The XRPD data for a series of $TiO_2$—$(MoO_3)_x$ core-shell compounds (FIG. 1) exhibited diffraction peaks that could be indexed on the $TiO_2$ (anatase) unit cell. In FIG. 1, the lowest set of stick-figure data is that reported for pure anatase $TiO_2$. No crystalline molybdenum oxide phase was observed in the XRPD data. Based on the peak broadening, the $TiO_2$ was determined to be nanocrystalline, with the crystallite size decreasing as the $MoO_3$ shell thickness increased. The average $TiO_2$ crystallite size was determined using the Scherrer equation and confirmed with high-resolution transmission electron microscopy. The crystallite diameters are: $TiO_2$—$(MoO_3)_{0.18}$: 80 Å, $TiO_2$—$(MoO_3)_{0.54}$: 60 Å, $TiO_2$—$(MoO_3)_{1.1}$: 50 Å, $TiO_2$—$(MoO_3)_{1.8}$: 40 Å.

High resolution transmission electron microscopy (HRTEM) studies on these samples supported the anatase crystallite size calculated from the XPD data, and also confirmed there was no crystalline or large (>20 Å) amorphous molybdenum oxide phases. Images from high-resolution transmission electron microscopy (HRTEM) studies on these samples exhibited particles with well-defined lattice fringes. The lattice spacing of the crystallites with non-crossed fringes measured 3.5±0.05 Å, which corresponds to the distance between the (101) planes in anatase $TiO_2$. The $TiO_2$ crystallite sizes measured in the HRTEM images were similar to those calculated from the XRPD data. Finally, there were no crystalline or large ($\geq 10$ Å) amorphous molybdenum oxide domains evident in HRTEM data.

Figure 2:
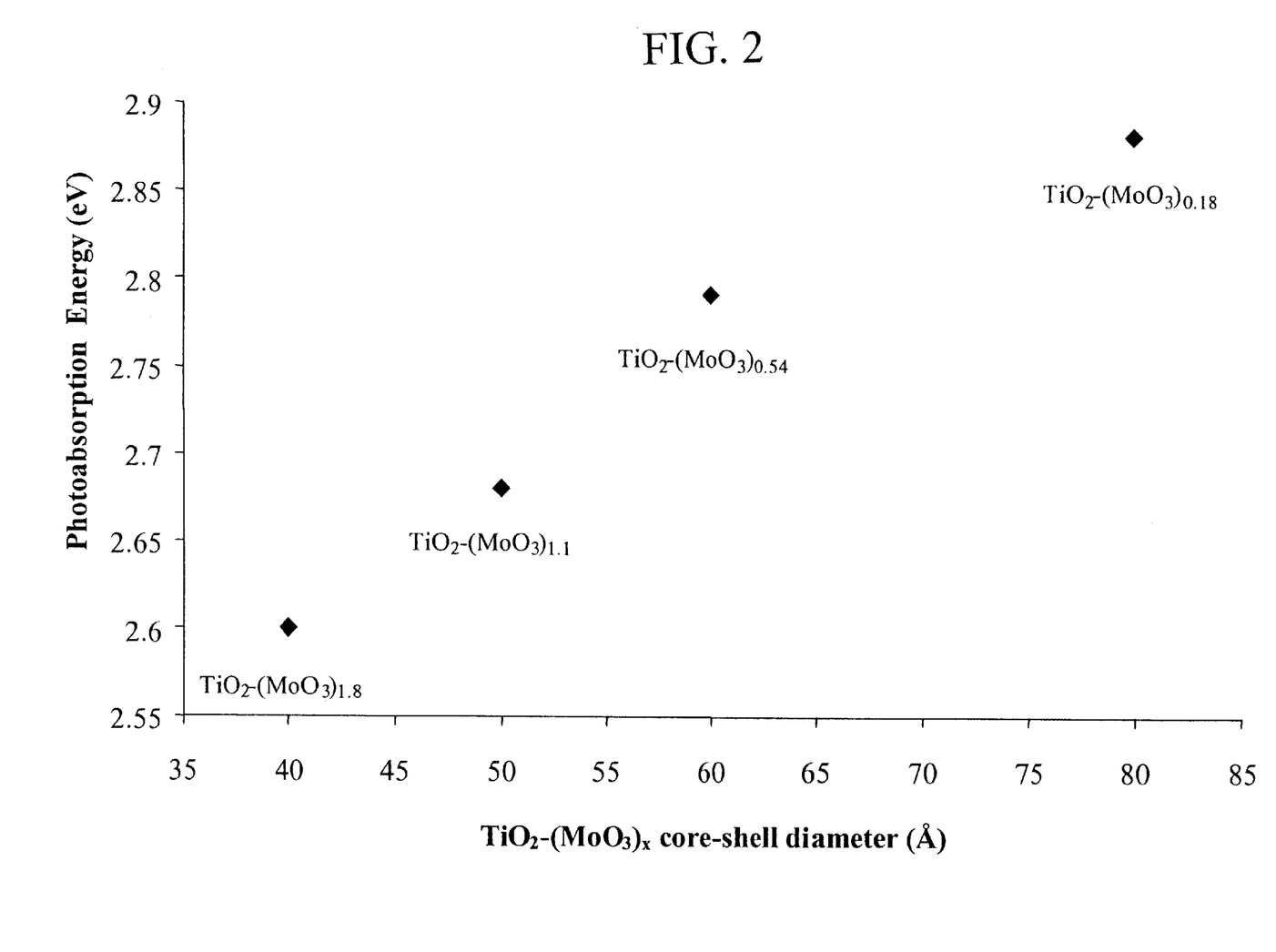
FIG. 2 shows a plot of the $TiO_2$—$(MoO_3)_x$ photoabsorption energy (PE) as a function of $TiO_2$—$(MoO_3)_x$ core-shell diameter (i) $TiO_2$—$(MoO_3)_{0.18}$: 80 Å, PE=2.88 eV; (ii) $TiO_2$—$(MoO_3)_{0.54}$: 60 Å, PE=2.79 eV; (iii) $TiO_2$—$(MoO_3)_{1.1}$: 50 Å, PE=2.68 eV; (iv) $TiO_2$—$(MoO_3)_{1.8}$: 40 Å PE=2.60 eV.

Diffuse Spectral Reflectance (DSR) data was collected and confirmed that the color variation observed is due to a regular decrease in the photoabsorption energy (PE) with increasing $MoO_3$ shell thickness. A plot of PE vs. particle size (FIG. 2) clearly shows that the bandgap energies of the $TiO_2$—$(MoO_3)_x$ compounds become progressively more red-shifted, with decreasing nanoparticle size. For comparison, PE for bulk anatase is 3.2 eV and is 2.9 eV for bulk $\alpha$-$MoO_3$. The $TiO_2$—$(MoO_3)_x$ bandgap energies range from 2.88–2.60 eV, approximately equal to or lower in energy than bulk $MoO_3$. At 2.60 eV, the absorption is in the most intense region of the solar spectrum.

As a clarifying note, despite the increase in $MoO_3$ shell thickness when going from $TiO_2$—$(MoO_3)0.18$ to $TiO2$—$(MoO_3)_{1.8}$, the overall particle size (core+shell) decreases since the $TiO_2$ core size decreases rapidly in this series, but the shell is never more than ~6 Å thick. The plot of PE vs. particle size (FIG. 2) clearly shows that the PE becomes more red-shifted with decreasing particle size. Such behavior is unexpected for nanocrystalline materials.

The electronic bandgap transitions for the $TiO_2$—$(MoO_3)_x$ compounds are fundamentally different than those previously reported for II–VI and III–V core-shell systems. Theoretical and experimental work on II–VI and III–V core-shell nanoparticle systems indicate that PE is a function of both size quantization effects and the relative composition of the core-shell particle (i.e. relative thickness of the core and shell). In the limiting case it is logical to expect the PE of a core-shell nanoparticle system to be greater than or equal to the smallest band gap material comprising the core-shell system. In addition to this, a PE blue-shift, relative to the band gap energies of the bulk materials, is expected when the core-shell particle size is in the quantum regime (i.e., core diameter or shell thickness equal to or smaller than the Bohr radius of the valence/conduction band electron). Indeed, previous work demonstrates these two effects. For these reasons the PE for the $TiO_2$—$(MoO_3)_x$ core-shell materials was expected to be greater than 2.9 eV (PE for $MoO_3$), and likely greater than 3.2 eV (Eg for $TiO_2$) due to the dominant size quantization effects, especially for $TiO_2$—$(MoO_3)_{1.8}$ where the core-shell size is ~40 Å. For example, a band gap energy blue-shift is observed for PNNL-1 (Eg=3.32 eV)$_x$ which contains nanocrystalline $TiO_2$ with an average crystallite size of 25–30 Å. In contrast, the $TiO_2$—$(MoO_3)_x$ PE's range from 2.88 to 2.60 eV, approximately equal to or lower in energy than bulk $MoO_3$, which places the PE of $TiO_2$—$(MoO_3)_{1.8}$ in the most intense region of the solar spectrum. The charge-transfer absorption properties exhibited by the $TiO_2$—$(MoO_3)_x$ compounds appear to be fundamentally different than previously reported for the II–VI and III–V core-shell systems. Conversely, the $TiO_2$—$(MoC)_3)_x$ materials did not fluoresce when they were photoexcited at energies above their PE edge, as opposed to a sample of pure $TiO_2$ that gave a characteristic fluorescence spectrum. The lack of fluorescence is readily understood considering that the $TiO_2$—$(MoO_3)_x$ materials exhibit photochromic properties: they become blue/black in color when exposed to light under ambient conditions. This photochromism was studied by irradiating each of the powders with monochromatic light, and it was found that all of the samples turned blue/black when excited with light having 420 nm ($TiO_2$—$(MoO_3)_{0.18}$) $\leq \lambda \leq 460$ nm ($TiO_2$—$(MoO_3)_{1.8}$). For comparison, bulk $TiO_2$ and $MoO_3$ exhibit photochromism, but only when irradiated with ultraviolet light (~300 nm). The photochromic behavior of the materials is believed to be first reported visible-light induced photochromism of $TiO_2$ or $MoO_3$ without prior bluing by cathodic polarization.

Considering the relative ease in which reduced molybdenum oxides are formed, generally called Magneli phases, EPR data was collected on the $TiO_2$—$(MoO_3)_x$ compounds to determine if paramagnetic molybdenum species played a role in the observed optical properties. Both CW-EPR spectra and profiles of the electron spin-echo intensity as a function of magnetic field were recorded between room temperature and 5 K for each sample. There was a single dominant EPR signal exhibiting roughly axial symmetry with $g_\parallel$=1.883 and $g_\perp$=1.93. The relative ordering of the g-values is typical for Ti(III) in oxides, while the opposite is usually observed for Mo(V) in oxides. In addition, Ti(III) at the surface of an aqueous colloid of $TiO_2$ has $g_\parallel$=1.88 and $g_\perp$=1.925, making it likely the EPR signal from the samples is due to Ti(III) either at an exposed $TiO_2$ surface or at the Ti/Mo interface. Assuming equal packing densities for each sample, the double integrals of the CW-spectra indicated that the number of spins was directly proportional to the Mo content. However, because the packing density of the samples in the EPR tubes was not known very accurately, double integration was not a precise method for determining absolute spin concentrations in the sample. Yet, the possibility that these centers might be responsible for the PE shifts made such data important. We therefore turned to measurements of the electron spin-spin relaxation to set upper limits on the absolute spin concentration. Interaction with nearby paramagnetic centers is one reason for decay of the two-pulse electron spin-echo and adds to the decay rate from other sources. The decay rate caused by nearby spins is well understood and for these samples is expected to be equal to $\alpha_C \cdot C_{loc}$ where $\alpha_c \sim (0.3-0.9) \times 10_{-13}$ cm$^3$/s and $C_{loc}$ is the local concentration of paramagnetic species. The electron spin-echo decay rates were not obviously related to Mo content and varied between $0.4 \times 10^6$ and $1.25 \times 10^6$ s$^{-1}$ with little, if any, temperature dependence below 150 K. Taking the fastest decay as an absolute upper bound on local paramagnetic concentration, which occurs in the sample with the highest Mo content ($TiO_2$—$(MoO_3)_{1.8}$), gives a local concentration of paramagnetic centers of $4 \times 10^5$ Å$^{-3}$. This corresponds to approximately one paramagnetic center per particle. The CW EPR measurements showed that the number of centers is 10 times less in $TiO_2$—$(MoO_3)0.18$, suggesting a local concentration 10 times lower in a particle with roughly 10 times larger volume, again giving an upper limit of approximately one paramagnetic center per particle. The actual local concentration is probably at least an order of magnitude lower than this upper bound.

Figure 3:
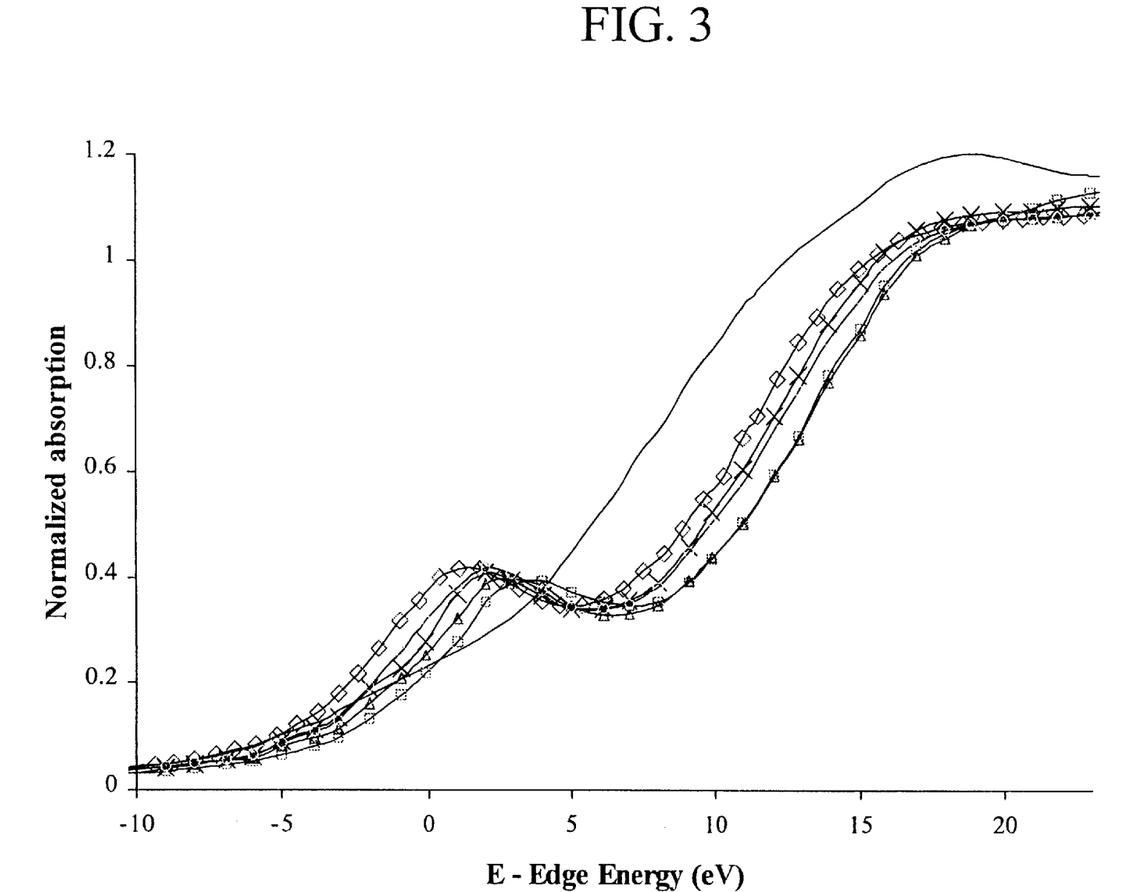
FIG. 3 shows the Mo K-edge XANES data for α-$MoO_3$ (□), $TiO_2$—$(MoO_3)$0.18 (Δ), $TiO_2$—$(MoO_3)_{0.54}$ (x), $TiO_2$—$(MoO_3)_{1.1}$ (O), and $TiO_2$—$(MoO_3)_{1.8}$ (◊), and $MoO_2$ (solid line).

X-ray absorption near edge structure (XANES) data was collected as a means to separately evaluate the Ti—O and Mo—O structural connectivity. The Ti K-edge and preedge data for all four $TiO_2$—$(MoO_3)_x$ compounds were nearly identical with that of the $TiO_2$ (anatase) standard. This supports the XRPD data and confirms that there is very little, if any, Mo in the anatase lattice: the $TiO_2$ and molybdenum oxide are in separate phases with an interface. The Mo K-edge XANES data (FIG. 3) clearly demonstrate that the edge and preedge features shift to lower energy in a regular fashion as the $MoO_3$ shell thickness increases, but the overall shape remains quite similar to that of $\alpha$-$MoO_3$. The shift in energy suggests a significant increase in the covalency of the Mo—O bonding, or O→Mo charge transfer, yet the overall Mo coordination is akin to that of $\alpha$-$MoO_3$.

Figure 4:
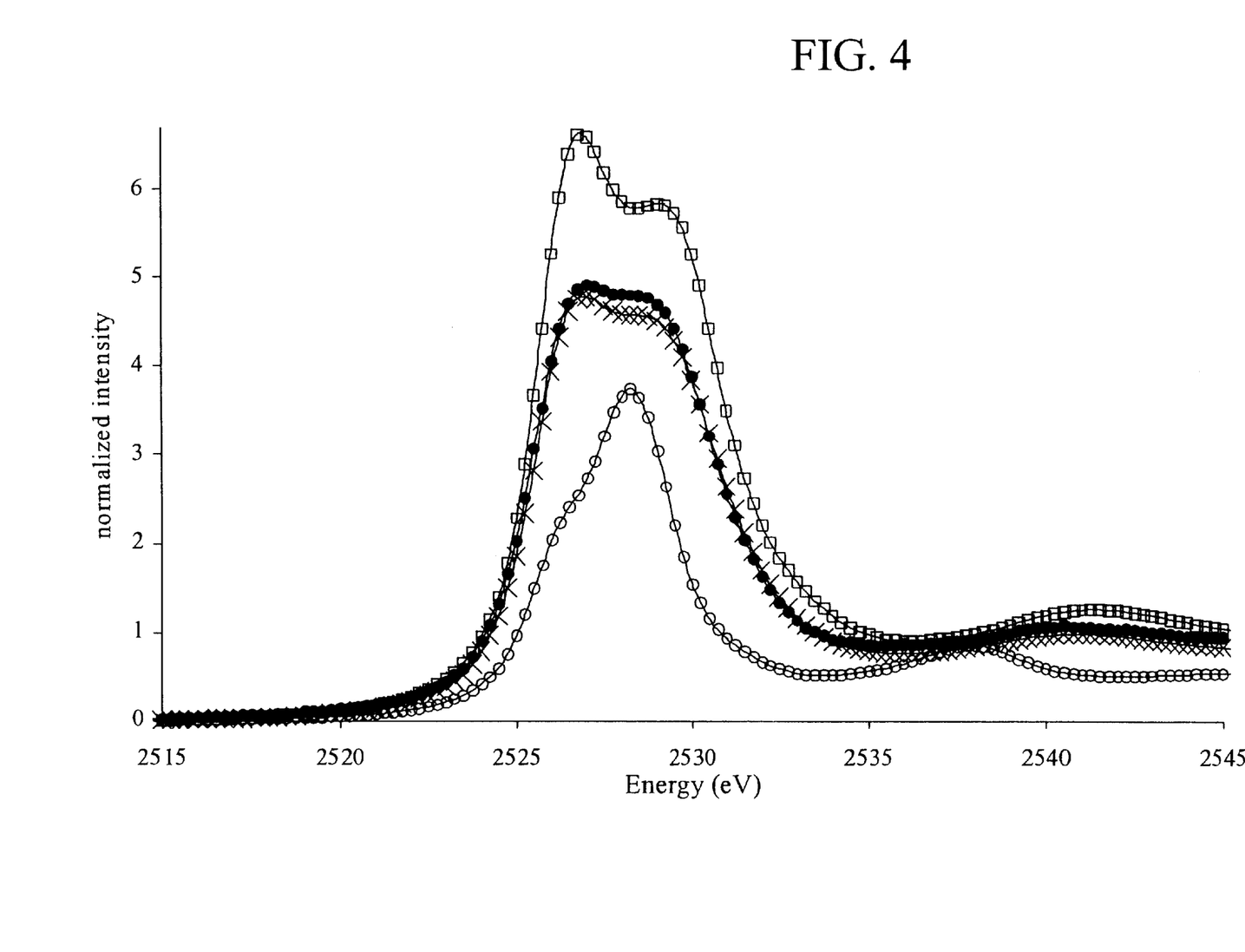
FIG. 4 shows the Mo—$L_3$-edge XANES data for α-$MoO_3$ (□), $TiO_2$—$(MoO_3)_{0.18}$ (●),$TiO_2$—$(MoO_3)_{1.8}$ (x), and $Na_2MoO_4$ (O).

Mo $L_3$-edge data were collected because they are particularly useful for determining the coordination symmetry (especially tetrahedral vs octahedral) about Mo. For tetrahedrally or octahedrally coordinated Mo, the $L_3$-edge data are characterized by two absorption peaks with an approximately 2:3 (e below $t_2$) and 3:2 ($t_{2g}$ below $e_g$) ratio in their intensities, respectively. In addition, the energy difference between the two absorption peaks is greater for octahedrally coordinated Mo (typically 3.1–4.5 eV) since the $t_{2g}/e_g$ splitting is greater than the $e/t_2$ splitting in tetrahedral coordination (typically 1.8–2.4 eV) due to the crystal field interactions. FIG. 4 illustrates the Mo $L_3$-edge data for the $TiO_2$—$(MoO_3)_x$ (x=0.18 and 1.8) compounds, along with $\alpha$-$MoO_3$ (octahedral Mo$^{6+}$) and $Na_2MoO_4$ (tetrahedral Mo$^{6+}$). FIG. 4 shows that the $TiO_2$—$(MoO_3)_x$ $L_3$-edge data have a low-energy peak of greater intensity than the high-energy peak which is in agreement with Mo in octahedral coordination. The $TiO_2$—$(MoO_3)_x$ peak intensity ratio is not exactly 3:2 as in $\alpha$-$MoO_3$, which may be attributed to the distorted (i.e. low symmetry) structural nature of the $MoO_6$ octahedra in the shell. The second derivatives of the $L_3$-edge data were used to more accurately determine the energy separating the absorption peaks and yielded a difference of 3.1 eV, which falls within the energy range expected for Mo$^{6+}$ octahedrally coordinated by oxygen. Again, the splitting energy is at the low end of the range and is also likely the result of the structural distortions in the $MoO_3$ shell which lift the $t_{2g}/e_g$ orbital degeneracies and reduce the energy difference between the upper and lower 4d manifolds.

Figure 5:
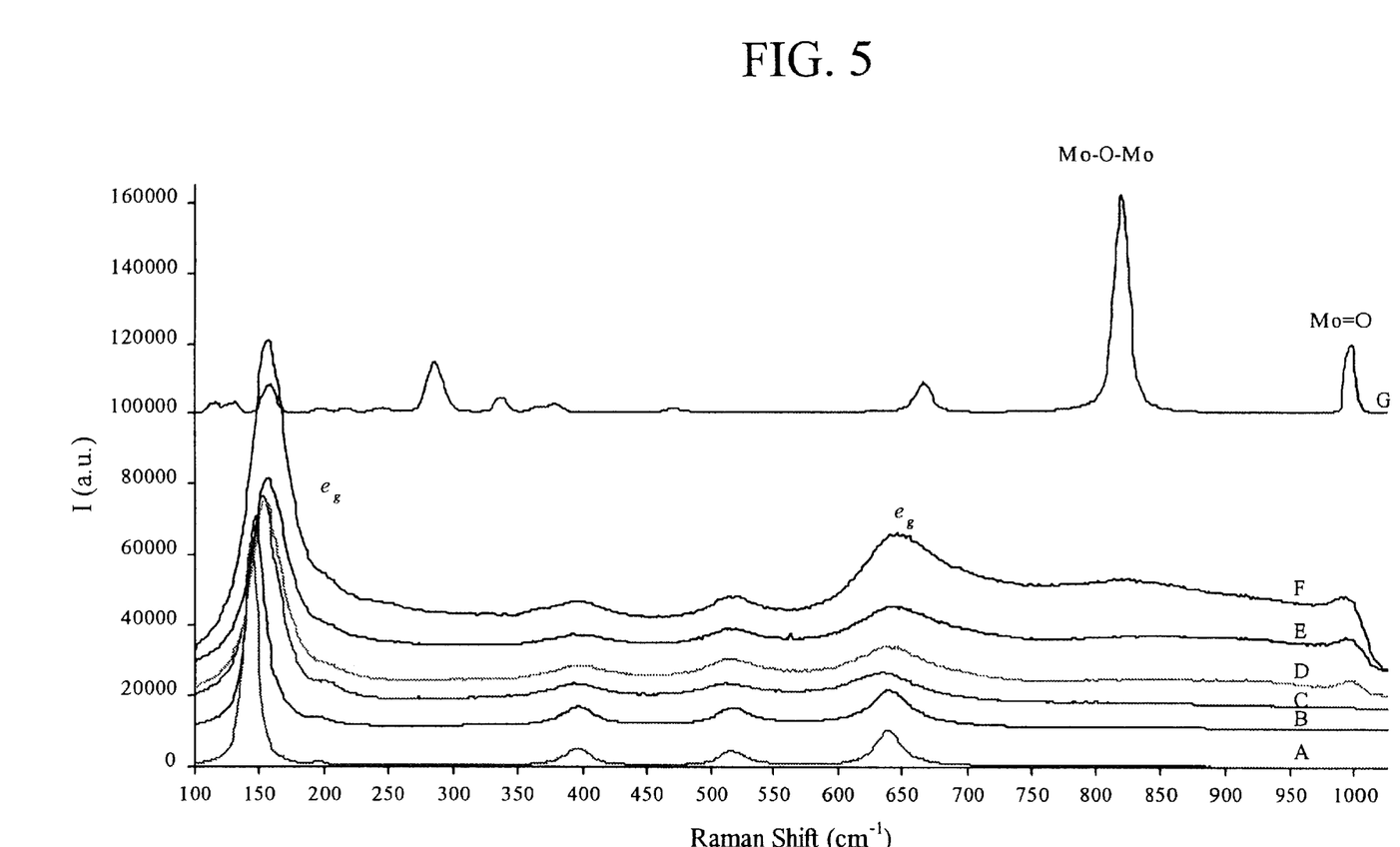
FIG. 5 shows Raman Scattering data for the series of $TiO_2$—$(MoO_3)_x$ core-shell materials, and $TiO_2$ and α-$MoO_3$ for comparison: (A) anatase $TiO_2$ standard, (B) anatase $TiO_2$ with average crystallite size of 100 Å; (C) $TiO_2$—$(MoO_3)$ 0.18; (D) $TiO_2$—$(MoO_3)_{0.54}$; (E) $TiO_2$—$(MoO_3)_{1.1}$; (F) $TiO_2$—$(MoO_3)_{1.8}$; and (G) α-$MoO_3$.

Raman scattering data (FIG. 5) were collected on the $TiO_2$—$(MoO_3)_x$ materials to gain further evidence for the core-shell arrangement, since these measurements are quite sensitive to the atomic connectivity. The data labeled as $TiO_2$ (std.) (curve A) in FIG. 5 are from powder that is 99% anatase (estimated from XRPD data) with average crystallite size greater than 0.5 μm. These data match the literature data for anatase $TiO_2$. The next set of data labeled 100 Å $TiO_2$ (curve B) are for a powder that resulted when no $Mo_8O_{26}^{4-}$ (aq) was included in the reaction described in Example 3 above. These data are quite similar to the $TiO_2$ (std.) data except there is a slight shift of the two $e_g$ bands to higher wavenumber due to the quantum confinement of the phonon states in the $TiO_2$ nanocrystallites. The data between 100 and 700 $cm^{-1}$ for the $TiO_2$—$(MoO_3)_x$ materials are quite similar to those of 100 Å $TiO_2$ except for the progressively greater shift to higher energy of the $e_g$ bands and an increase in band broadening. This is expected since the nanocrystalline $TiO_2$ size decreases as $MoO_3$ coverage increases. The other feature is the appearance of a broad peak at ~820 $cm^{-1}$ and a second peak at ~1000 $cm^{-1}$. Both of these peaks become more prominent with increasing $MoO_3$ content, and their origin can be easily understood by comparing them to the Raman data for $\alpha$-$MoO_3$ (curve G). The peak at ~820 $cm^{-1}$, most apparent in the $TiO_2$—$(MoO_3)_{1.8}$ data (curve F), is attributed to the Mo—O—Mo stretching mode of the corner sharing $MoO_6$ octahedra. This Raman band should be most evident in $TiO_2$—$(MoO_3)_{1.1}$ and $TiO_2$—$(MoO_3)_{1.8}$ since these two have at least one complete $MoO_3$ shell. The 820 $cm^{-1}$ band is the strongest band in the $\alpha$-$MoO_3$ data ($a_{1g}/b_{1g}$ mode), but is rather ill defined in the $TiO_2$—$(MoO_3)_x$ data due to the highly distorted corner sharing octahedral arrangement in the shell. The better-defined Raman band at ~1000 $cm^{-1}$ matches the symmetric Mo=O stretch ($b_{3u}$ mode) in $\alpha$-$MoO_3$. The Mo=O groups in the $\alpha$-$MoO_3$ structure are located at the surface of the (010) slabs, pointing out. However, there are no other distinct $\alpha$-$MoO_3$-like bands in the $TiO_2$—$(MoO_3)_x$ Raman data, which indicates the shell does not possess any long-range crystalline order. Previous Raman studies on dispersed molybdenum oxide compounds have shown the presence of polymolybdate and pentacoordinate molybdate surface species. However, in contrast to our materials, the structural nature of the surface molybdenum oxide species were found to be highly dependent on the concentration of molybdenum oxide present and whether the samples were hydrated (i.e. exposed to ambient air) or dehydrated. The 998 $cm^{-1}$ band position in $\alpha$-$MoO_3$ (M=O stretching mode) is not influenced by hydration, and this is what is observed for $TiO_2$—$(MoO_3)_x$ materials (all samples were stored and measured under ambient conditions). This strongly indicates that our new compounds have a molybdenum oxide shell structurally similar to $\alpha$-$MoO_3$, and not like $MoO_4^{2-}$, $Mo_7O_{24}^{6-}$, $Mo_8O_{26}^{4-}$, or pentacoordinate species.

Figure 6:
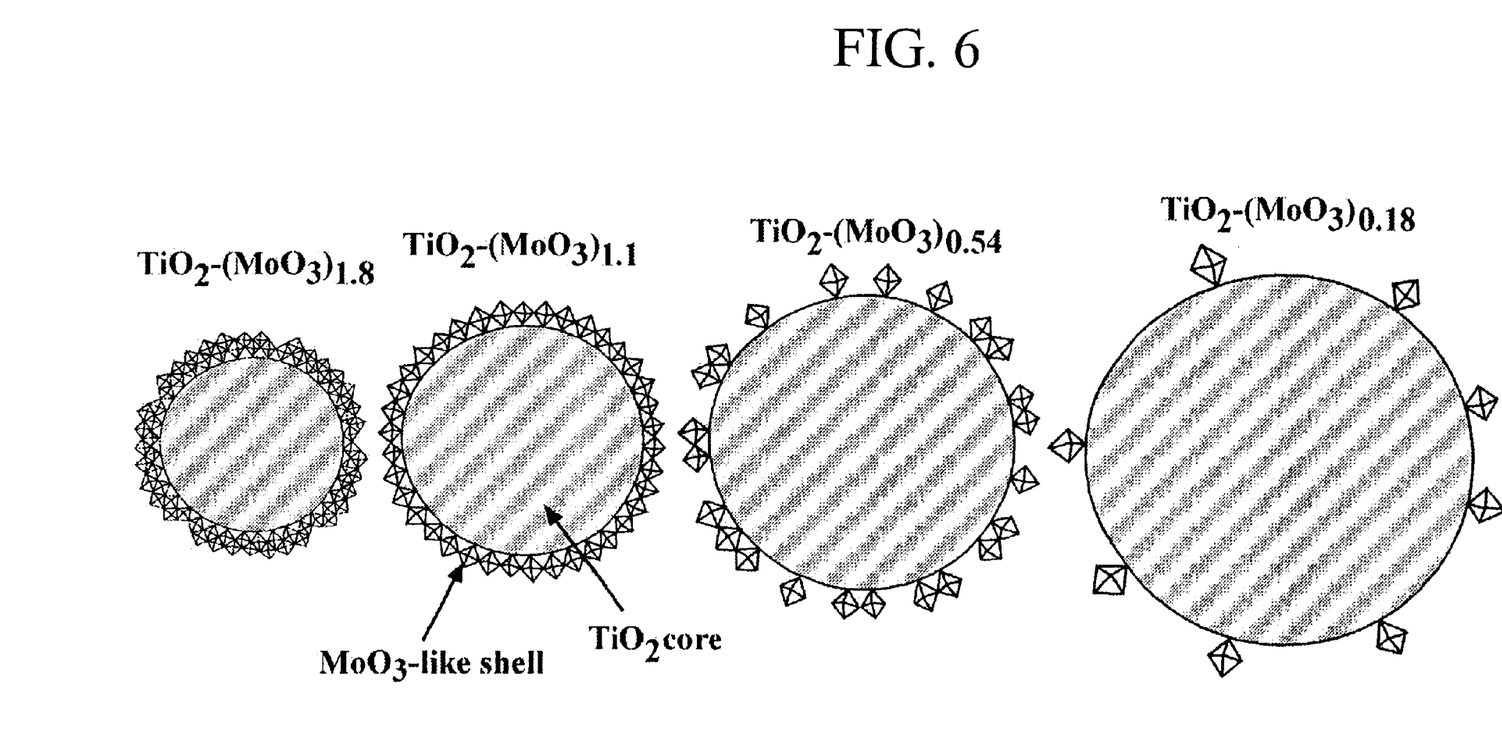
FIG. 6 shows an idealized cross-section view of the $TiO_2$—$(MoO_3)_x$ core-shell particles (relative size and shell thickness are accurate).

The previously discussed data and interpretations are consistent with $MoO_3$ forming a monolayer (from partial to complete) or shell about the $TiO_2$ nanocrystals: a core-shell system. The core-shell structural arrangement apparently results from an epitaxial growth or dispersion of $\alpha$-$MoO_3$ on the $TiO_2$ nanocrystals when the materials are calcined. This nanoarchitectural arrangement is possible due to an efficient and concerted nucleation of the anionic metal oxide nanoparticles (Tyzor LA and $Mo8O_{26}^{4-}$) at the surface of the cationic CTAC micelles, which places the titania and molybdenum oxide phases in an intimate and well-dispersed arrangment. Several previous reports have shown that molybdenum oxide species readily disperse on macroscopic metal oxide supports due to strong X—O—Mo (X=Ti, Zr, Al, and Si) bonding. Moreover, there is only a small lattice mismatch between the a,c unit cell axes of $\alpha$-$MoO_3$ and the a unit cell axis of anatase (4.7% and 2.3%, respectively) and considering the anatase unit cell as pseudo-cubic, it is reasonable to suppose that $\alpha$-$MoO_3$-like shells nucleate at the surface of anatase nanocrystallites (FIG. 6). Since the XANES and Raman data are consistent with $TiO_2$ and $MoO_3$ existing in separate phases in $TiO_2$—$(MoO_3)_{0.18}$ (least amount of molybdenum oxide in the series), then the maximum Mo dopant level (if any) would be present in this material, and hence the change in optical and structural properties in the $TiO_2$—$(MoO_3)_x$ series cannot be due to increasing dopant levels in the anatase core. The EPR data conclusively show the ensemble of particles in each of the $TiO_2$—$(MoO_3)_x$ materials to have on average at most one paramagnetic center per core-shell particle. Moreover, each sample is relatively homogeneous, as far as the PE shifts are concerned, exhibiting relatively sharp edges in the absorption spectra. These spectral observations are consistent with a homogeneous distribution of paramagnetic centers (if they indeed contributed to the exhibited optical properties), rather than a fraction of the nanoparticles containing no paramagnetic centers and having no PE shift, another fraction with one paramagnetic center and a shifted PE, and another fraction with two or more paramagnetic centers with yet another PE shift. It is unlikely a mechanism exists that would generate one and only one paramagnetic center per particle, therefore the PEs are seemingly unrelated to the presence of paramagnetic species. This is an especially important point considering that the calculated paramagnetic center concentration is an upper bound, and so it is very probable that there is less than one center per particle. This would mandate electronic, and in turn optical, inhomogeneities in the ensemble of core-shell particles which we have not observed in any of our experimental data. Finally, the only reported Ti/Mo ternary oxide phase is $TiMoO_5$ with a band gap energy of 3.2 eV.

Figure 7:
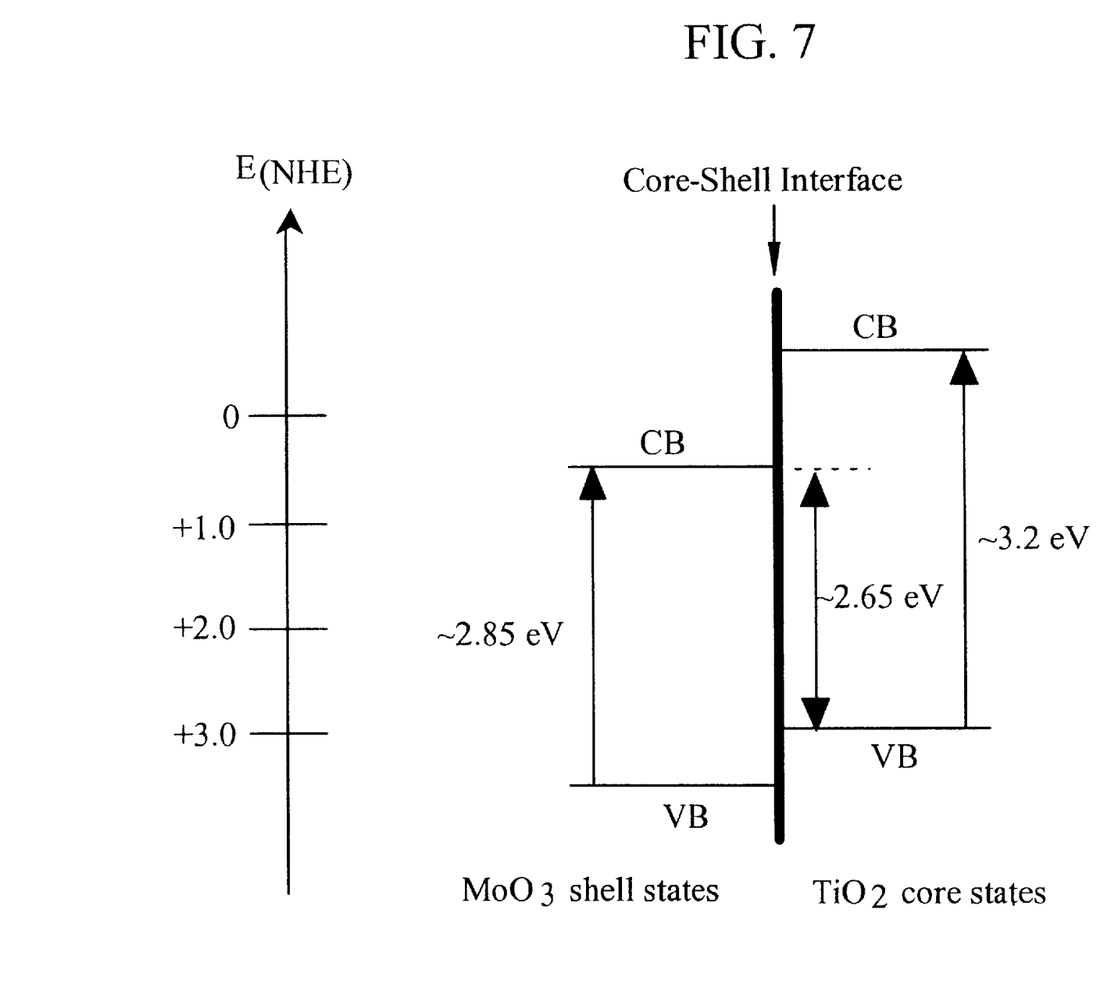
FIG. 7 shows the arrangement of the $TiO_2$ core and $MoO_3$ shell valence bands (VB) and conduction bands (CB) for $TiO_2$—$MoO_3)_{1.8}$ after heterojunction formation.

The data support a conclusion that the optical absorption properties exhibited by the $TiO_2$—$(MoO_3)_x$ materials are due to charge-transfer processes at the semiconductor heterojunction that is established as a result of the chemical bonding between the $TiO_2$ core and the $MoO_3$ shell. This allows the core-shell wave functions to overlap at the interface, giving rise to a heterojunction band structure. FIG. 7 depicts the valence band (VB)/conduction band (CB) arrangement in $TiO_2$—$(MoO_3)_{1.8}$ after heterojunction formation. The lowest energy excitation is from the $TiO_2$ VB to the $MoO_3$ CB, a core-shell charge transfer, and this energy closely matches the measured PE of $TiO_2$—$(MoO_3)_{1.8}$. This electronic transition is probably allowed due to the reduced symmetry at the core-shell interface. The regular decrease in band gap energy with increasing $MoO_3$ shell thickness (FIG. 2) may be attributed to the reduced confinement of the electronic states in the shell, as it evolves from isolated $MoO_3$ islands ($TiO_2$—$(MoO_3)_{0.18}$) to nearly two complete $MoO_3$ mono-layers ($TiO_2$—$(MoO_3)_{1.8}$) (see FIG. 6). It has been shown experimentally and theoretically that the edge energy (or the energy difference between the HOMO and LUMO) of both aqueous and supported polyoxomolybdate clusters decreases as the cluster size increases. This effect is due to the increased spatial delocalization of the molecular orbitals as the clusters grow. However, the minimum edge energy attainable is that when the polyoxomolybdate clusters grow to form crystalline $MoO_3$. In a similar fashion, a red-shift is observed in the PE's as the $MoO_3$ shell grows from less than a monolayer to two monolayers (right to left in FIG. 6). But in contrast to previous work, the $TiO_2$—$(MoO_3)_x$ PE's are also red-shifted from bulk $MoO_3$ since the photoexcited electronic transitions occur between the core and the shell, as opposed to within the core or within the shell. These optical absorption transitions occur at increasingly lower energies since the energy difference between the $TiO_2$-core VB and the $MoO_3$-shell CB (or LUMO) is decreasing as a result of the contraction in the $MoO_3$ HOMO/LUMO gap, as the shell grows. Finally, the visible-light induced photochromism is in agreement with a hybrid core-shell electronic structure, since bulk $TiO_2$ and $MoO_3$ exhibit photochromic effects only when photoexcited in the ultraviolet. It is evident that the photophysical properties exhibited by the series of $TiO_2$—$(MoO_3)_x$ compounds are not a simple linear combination of those of the nanocrystalline $TiO_2$ core and the $MoO_3$ shell, but instead entirely new photophysical properties are observed as a result of the core-shell nanoarchitecture and the electronic transitions this structure supports.

The semiconductor heterojunction has a pronounced influence on the overall electronic properties of the $TiO_2$—$(MoO_3)_x$ compounds, which may be explained on the following basis. In a typical crystallite of anatase $TiO_2$ the fraction of $TiO_2$ units at the surface is proportional to 12.5 Å/d, where d is the diameter of the particle. Thus, the $TiO_2$—$(MoO_3)_x$ materials, the fraction of $TiO_2$ units at the core-shell interface is 16% for $TiO_2$—$(MoO_3)_{0.18}$, 21% for $TiO_2$—$(MoO_3)_{0.54}$, 25% for $TiO_2$—$(MoO_3)_{1.1}$, and 31% for $TiO_2$—$(MoO_3)_{1.8}$. Therefore, the trend in the PEs may be viewed as resulting from the dominant chemical/electronic interactions at the core-shell interface.

The core-shell interface and the electronic transitions between these two structural motifs should also have a major influence on the photocatalytic properties exhibited by the $TiO_2$—$(MoO_3)x$ materials, and ultimately their utility in technologically important processes. The fact that none of the $TiO_2$—$(MoO_3)_x$ compounds fluoresce, as opposed to pure $TiO_2$, is indicative that $e^-/h^+$ pair recombination is predominantly nonradiative (i.e., the energy is dissipated as heat through phonon modes), or the $e^-/h^+$ pairs are lost through photoinduced changes (e.g., photochromism) in the material. Previous studies have shown that metal dopants in nanocrystalline $TiO_2$ can provide sites for efficient $e^-/h^+$ pair recombination, thus rendering them unavailable for photocatalytic activity. The core-shell materials do not have molybdenum dopants in the $TiO_2$ core or titanium dopants in the $MoO_3$ shell, but structural distortions at the core-shell interface may provide suitable defect sites for efficient nonradiative $e^-/h^+$ pair recombination. It is more likely in this case, however, that photoexcited $e^-/h^+$ pairs could participate in both photochromic and photocatalytic processes simultaneously. In other words, photogenerated $e^-/h^+$ pairs may be less available for participation in photocatalytic processes since they can be lost or trapped as a result of photochromic changes in the material. Indeed, Table 2 shows that both $TiO_2$—$(MoO_3)_{0.54}$ and $TiO_2$—$(MoO_3)_{1.8}$ are less efficient than Degussa P25 for the photocatalytic oxidation of acetaldehyde.

Additional information regarding the $TiO_2$—$(MoO_3)_x$ materials may be found in Elder et al., *J. Am. Chem. Soc.*, 122: 5138–46, 2000, which is incorporated herein by reference.

TABLE 2

Conversion Efficiencies for the Gas-Phase Photocatalytic Oxidation of Acetaldehyde

| Catalyst | Light Source/Filter | % Conversion |
|---|---|---|
| Degussa $TiO_2$ | Hg lamp/quartz | 18 |
| | Xe lamp/quartz | 63 |
| | Xe lamp/Pyrex | 22 |
| | Xe lamp/Pyrex and 420 nm cutoff filter | 0.0 |

TABLE 2-continued

Conversion Efficiencies for the Gas-Phase Photocatalytic Oxidation of Acetaldehyde

| Catalyst | Light Source/Filter | % Conversion |
|---|---|---|
| $TiO_2$—$(MoO_3)_{1.8}$ | Hg lamp/quartz | 0.0 |
| | Xe lamp/quartz | 25 |
| | Xe lamp/Pyrex | 15 |
| | Xe lamp/Pyrex and 420 nm cutoff filter | 0.0 |
| $TiO_2$—$(MoO_3)_{0.54}$ | Hg lamp/quartz | 0.0 |
| | Xe lamp/quartz | 20 |
| | Xe lamp/Pyrex | 11 |
| | Xe lamp/Pyrex and 420 nm cutoff filter | 0.0 |

EXAMPLE 3

Preparation and Characterization of Mesoporous Vanadium Oxide/Nanocrystalline Titanium Dioxide Heterojunction Materials Titanate(2-), dihydroxy bis[2-hydroxypropanoate(2-)-$O^1$, $O^2$]-, ammonium salt (Tyzor LA from Dupont, 2.23M in Ti), $(NH_4)_6(V_{10}O_{28})$, and ceytltrimethylammonium chloride (CTAC, 29 wt. % from Lonza Chemical Co.) were combined in a 3 Ti:1 V:2 CTAC molar ratio. The resulting mixture was stirred while slowly adding water until irreversible precipitation was complete. The precipitate was stirred overnight at room temperature, at 70° C. for 24 h, and at 100° C. for 48 h in a sealed Teflon reactor. The aged precipitate was isolated by washing and centrifuging several times with fresh aliquots of water and the CTAC was removed by calcining in air at 450° C. for 2 h. Materials with Ti:V initial ratios of 9:1, 1:1, and 0.75:1 were also be prepared in an analogous fashion.

The polyoxometallate cluster $(NH_4)_6(V_{10}O_{28})$ used in this synthesis was prepared by dissolving $V_2O_5$ in water while simultaneously adjusting the pH to approximately 9 with concentrated $NH_4OH$. The pH was adjusted back to 5.5–5.6 with concentrated HCl to stablize the cluster.

Diffuse spectral reflectance measurements on the 3:1 material reveal a PE of 2.1 eV, which is lower than the PE of either $V_2O_5$ (PE=2.2 eV) or $TiO_2$. XRD measurements reveal an average nanoparticle size of about 93 Å.

EXAMPLE 4

Preparation of Mesoporous Aluminum Oxide/Nanocrystalline Titanium Dioxide Heterojunction Materials Titanate(2-), dihydroxy bis[2-hydroxypropanoate(2-)-$O^1$, $O^2$]-, ammonium salt (Tyzor LA from Dupont, 2.23M in Ti), $Al_{13}O_4(OH)_{24}Cl_{17}$, and ceytltrimethylammonium chloride (CTAC, 29 wt. % from Lonza Chemical Co.) were combined in a 3 Ti: 1 Al:2 CTAC molar ratio. The resulting mixture was stirred while slowly adding water until irreversible precipitation was complete. The precipitate was stirred overnight at room temperature, at 70° C. for 24 h, and at 100° C. for 48 h in a sealed Teflon reactor. The aged precipitate was isolated by washing and centrifuging several times with fresh aliquots of water and the CTAC was removed by calcining in air at 450° C. for 2 h. Materials with Ti:Al ratios of 9:1, 1:1, and 0.75:1 were prepared in an analogous fashion.

The stock solution of $Al_{13}O_4(OH)_{24}Cl_{17}$ polyoxometallate complex used in these syntheses was prepared by dissolving $AlCl_3 \cdot 6H_2O$ in water and adjusting the pH to approximately 4.

EXAMPLE 5

Preparation of Mesoporous Tungsten Oxide/Nanocrystalline Titanium Dioxide Heterojunction Materials Titanate(2-), dihydroxy bis[2-hydroxypropanoate(2-)-$O^1$, $O^2$]-, ammonium salt (Tyzor LA from Dupont, 2.23M in Ti), $(NH_4)_6(W_{12}O_{39})(H_2O)$, and ceytltrimethylammonium chloride (CTAC, 29 wt. % from Lonza Chemical Co.) were combined in a 3 Ti: 1 W:2 CTAC molar ratio. The resulting mixture was stirred while slowly adding water until irreversible precipitation was complete. The precipitate was stirred overnight at room temperature, at 70° C. for 24 h, and at 100° C. for 48 h in a sealed Teflon reactor. The aged precipitate was isolated by washing and centrifuging several times with fresh aliquots of water and the CTAC was removed by calcining in air at 450° C. for 2 h. Materials with Ti:W ratios of 9:1, 1:1, and 0.75:1 were prepared in an analogous fashion.

The polyoxometallate complex, $(NH_4)_6(W_{12}O_{39})(H_2O)$, used in these syntheses may be purchased from Aldrich, Milwaukee, Wis.

EXAMPLE 6

Preparation of Mesoporous Niobium Oxide/Nanocrystalline Titanium Dioxide Heterojunction Materials Titanate(2-), dihydroxy bis[2-hydroxypropanoate(2-)-$O^1$, $O^2$]-, ammonium salt (Tyzor LA from Dupont, 2.23M in Ti), $K_8Nb_6O_{19}$, and ceytltrimethylammonium chloride (CTAC, 29 wt. % from Lonza Chemical Co.) were combined in a 3 Ti: 1 Nb:2 CTAC molar ratio. The resulting mixture was stirred while slowly adding water until irreversible precipitation was complete. The precipitate was stirred overnight at room temperature, at 70° C. for 24 h, and at 100° C. for 48 h in a sealed Teflon reactor. The aged precipitate was isolated by washing and centrifuging several times with fresh aliquots of water and the CTAC was removed by calcining in air at 450° C. for 2 h. Materials with Ti:Nb ratios of 9:1, 1:1, and 0.75:1 were prepared in an analogous fashion.

The $K_8Nb_6O_{19}$ polyoxometallate complex was synthesized by dissolving $Nb_2O_5$ in KOH until a pH of between 11 and 13 was attained.

The preceding examples are set forth to illustrate the invention and are not intended to limit it. Additional embodiments and advantages within the scope of the claimed invention will be apparent to one of ordinary skill in the art. In the claims that follow, the singular terms "a", "an", and "the" include plural referents unless context clearly indicates otherwise.

We claim:

1. A heterojunction material, comprising:
   a nanocrystalline titanium dioxide phase; and
   a second metal oxide phase, wherein the nanocrystalline titanium dioxide phase is chemically bonded to the second metal oxide phase through a heterojunction formed at an interface between the nanocrystalline titanium dioxide phase and the second metal oxide phase.

2. The heterojunction material of claim 1, wherein the nanocrystalline titanium dioxide phase is anatase.

3. The heterojunction material of claim 1, wherein the material exhibits a photoabsorption energy lower than 3.2 eV.

4. The heterojunction material of claim 1, wherein the second metal oxide phase forms a shell around a core comprising the nanocrystalline titanium dioxide phase, the heterojunction formed at the interface between the shell and the core.

5. The heterojunction material of claim 4, wherein the shell comprises from less than a complete monolayer to one or more monolayers of the second metal oxide.

6. The heterojunction material of claim 4, wherein the shell is molybdenum oxide and the core is nanocrystalline anatase.

7. The heterojunction material of claim 6, wherein the molybdenum oxide phase has a structure substantially similar to bulk $\alpha$-$MoO_3$.

8. The heterojunction material of claim 6, wherein Mo $L_3$-edge data for the material has a low-energy peak of greater intensity than a high-energy peak.

9. The heterojunction material of claim 6, wherein a Raman scattering signal corresponding to the M= symmetric stretching mode is not influenced by hydration.

10. The heterojunction material of claim 1, wherein the metal oxide comprises a metal selected from the group consisting of V, W, Nb, Mo, Al and combinations thereof.

11. The heterojunction material of claim 10, wherein the metal is V, Al, W or Nb.

* * * * *

UNITED STATES PATENT AND TRADEMARK OFFICE
CERTIFICATE OF CORRECTION

PATENT NO. : 6,592,842 B2
APPLICATION NO. : 09/859799
DATED : July 15, 2003
INVENTOR(S) : Elder et al.

It is certified that error appears in the above-identified patent and that said Letters Patent is hereby corrected as shown below:

On TiTle Page

On Page 2, under OTHER PUBLICATIONS, "Tio$_2$" should read --T$_1$O$_2$--

On TiTle page (item 57)

"photoadsorption" should read -- photoabsorption --

In Column 2, lines 59-60, "(MoO$_3$)0.18" should read -- (MoO$_3$)$_{0.18}$--

In Column 2, line 67, "-MoO$_3$)$_{1.8}$" should read -- (MoO$_3$)$_{1.8}$--

In Column 3, line 18, "oribitals" should read -- orbitals --

In Column 4, line 64, "TiO2" should read -- TiO$_2$ --

In Column 5, line 12, "Na4Mo$_8$O$_{26}$" should read -- Na$_4$Mo$_8$O$_{26}$ --

In Column 5, line 44, "comer" should read -- corner --

In Column 5, line 45, "has" should read -- have --

In Column 6, line 48, "(MoO$_3$)0.18 to TiO2" should read
-- (MoO$_3$)$_{0.18}$ to TiO$_2$ ---

In Column 7, line 10, "(Eg=3.32 eV)$_x$" should read -- Eg.=3.32 eV) --

In Column 7, line 19, "TiO$_2$-(MoC)$_3$)$_x$" should read -- TiO$_2$-(MoO$_3$)$_x$ --

In Column 7, line 66, "α$c$" should read -- α$_c$ --

In Column 8, line 9, "(MoO$_3$)0.18" should read -- (MoO$_3$)$_{0.18}$ --

In Column 9, lines 18 and 25, "comer" should read -- corner --

In Column 9, line 22, "820" should read -- ~820 --

In Column 9, line 50, "Mo8O$_{26}^{4-}$" should read -- Mo$_8$O$_{26}^{4-}$ --

In Column 10, lines 59 and 62, "PE's " should read -- PE$_S$ --

In Column 11, line 18, "Thus, the" should read -- Thus, for the --

In Column 11, line 28, "(MoO$_3$)x" should read -- (MoO$_3$)$_x$ --

In Column 12, line 18, "to be first" should read -- to be the first --

In Column 12, line 25, "(NH$_4$ ) should read -- (NH$_4$) --

UNITED STATES PATENT AND TRADEMARK OFFICE
CERTIFICATE OF CORRECTION

PATENT NO. : 6,592,842 B2
APPLICATION NO. : 09/859799
DATED : July 15, 2003
INVENTOR(S) : Elder et al.

It is certified that error appears in the above-identified patent and that said Letters Patent is hereby corrected as shown below:

In Column 12, line 35, "also be" should read -- also --

In Column 12, line 41, "stablize" should read -- stabilize --

Signed and Sealed this

Twenty-ninth Day of August, 2006

JON W. DUDAS
*Director of the United States Patent and Trademark Office*